United States Patent [19]

Rexroad et al.

[11] 4,262,175
[45] Apr. 14, 1981

[54] DRAWOUT SWITCHGEAR WITH TELESCOPING CAM SHAFT

[75] Inventors: James O. Rexroad, Beaver; John P. Majcher, Chippewa Township, Beaver County, both of Pa.

[73] Assignee: Westinghouse Electric Corp., Pittsburgh, Pa.

[21] Appl. No.: 33,276

[22] Filed: Apr. 25, 1979

[51] Int. Cl.³ .............................................. H01H 9/20
[52] U.S. Cl. .................................. 200/50 AA; 361/336
[58] Field of Search ...................... 200/50 A, 50 AA; 361/335–339, 343, 344, 345

[56] References Cited

U.S. PATENT DOCUMENTS

| 2,885,502 | 5/1959 | Eichelberger et al. | 200/50 AA |
| 4,139,748 | 2/1979 | Wolfe et al. | 200/50 AA |

Primary Examiner—B. Dobeck
Assistant Examiner—Morris Ginsburg
Attorney, Agent, or Firm—L. P. Johns

[57] ABSTRACT

Drawout switchgear characterized by a circuit interrupter unit movable into and out of a cell between disconnected and connected positions of separable terminals supported in the cell and on said unit, a levering-on mechanism for moving said unit between disconnected and connected positions of the terminals, the levering-in mechanism comprising a pair of cams on a cam shaft which shaft comprises telescoping shaft segments to facilitate assembly of the operating mechanism.

5 Claims, 5 Drawing Figures

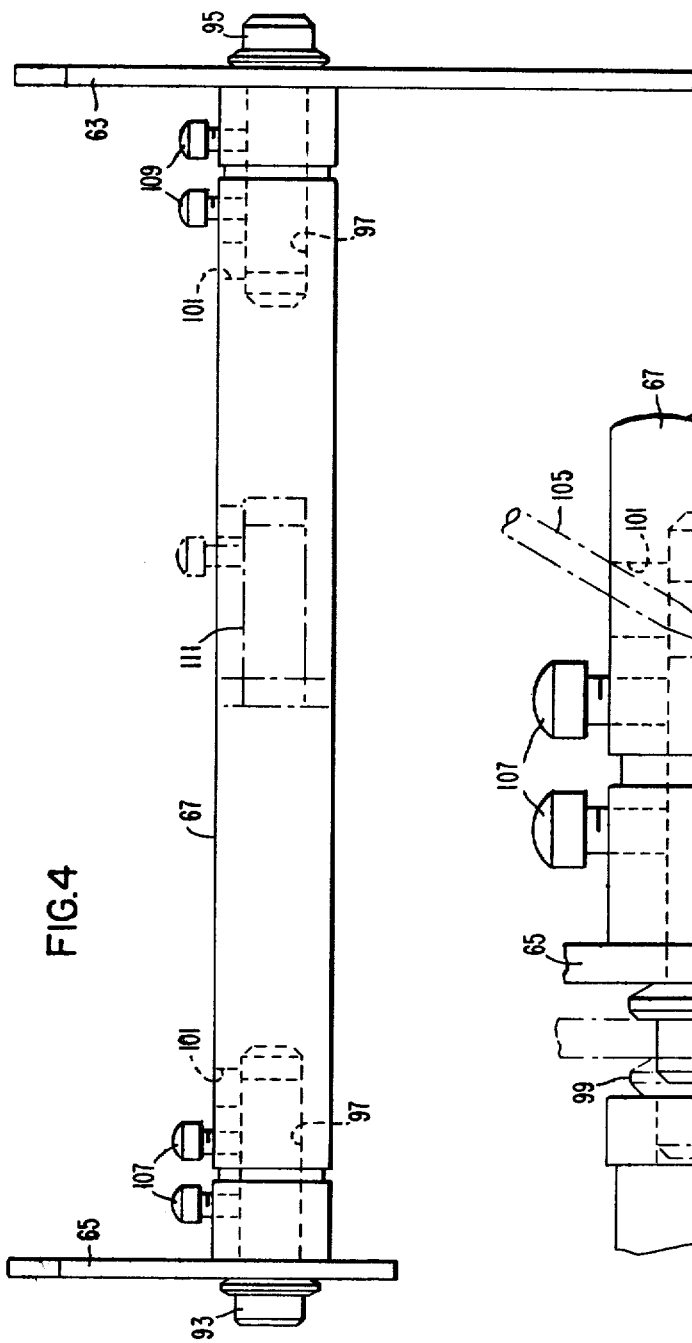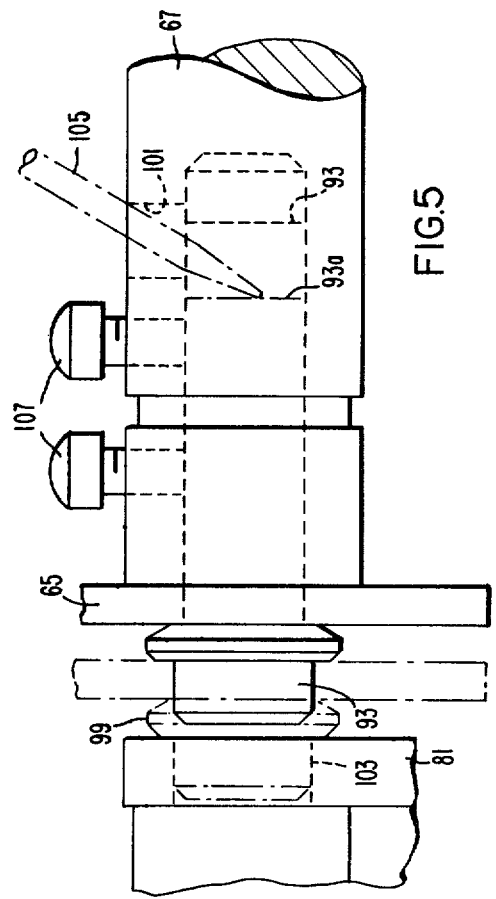

DRAWOUT SWITCHGEAR WITH TELESCOPING CAM SHAFT

BACKGROUND OF THE INVENTION

1. Field of the Invention

This invention relates to drawout switchgear and, more particularly, to a cam shaft therefor.

2. Description of the Prior Art

Most circuit breakers having very high interrupting capacities are designed to require a minimum amount of space. As a result, design requirements present a problem of critical space clearances which involve difficulties during assembly in a minimum-sized enclosure.

SUMMARY OF THE INVENTION

It has been found in accordance with this invention that problems of assembly of drawout switchgear may be overcome by providing a drawout switchgear comprising a cell having a front opening and a rear wall, stationary terminal means extending from the rear wall into the cell, a circuit interrupting unit movable into and out of the cell, movable terminal means on said unit and movable with the unit into and out of contact with the stationary terminal means, a levering-in mechanism for moving the unit between connected and disconnected positions of the terminal means, the levering-in mechanism comprising an operating shaft supported for rotation about an axis that extends generally in the direction of movement of said unit, a pair of cams pivotally mounted on the cell and operatively connected to the operating shaft and being reversely movable between two positions corresponding to the disconnected and connected positions, the cams having a slot extending from the cam periphery, a cam pin on the unit and movable into and out of operation with the cam slot for movement of said unit between the disconnected and connected positions, pivotal mounting means for the cams and comprising a cam shaft for the cams, the shaft having opposite end portions journally-mounted in the spaced frame member of the cell, the cam shaft being shorter than the space between the frame members, the cam shaft having an extension member slidably-mounted thereon for connection with the journal mountings and comprising an axial bore, and set screw means in the shaft for securing the extended cam shaft in place.

The advantage of the device of this invention is that it solves a difficult assembly problem of prior constructions.

BRIEF DESCRIPTION OF THE DRAWINGS

FIG. 4 is an elevational view of the cam shaft with cams mounted at opposite ends thereof; and FIG. 5 is a fragmentary view of the cam shaft and showing the manner in which a telescopic end portion may be extended during assembly.

DESCRIPTION OF THE PREFERRED EMBODIMENT

Figure 1:
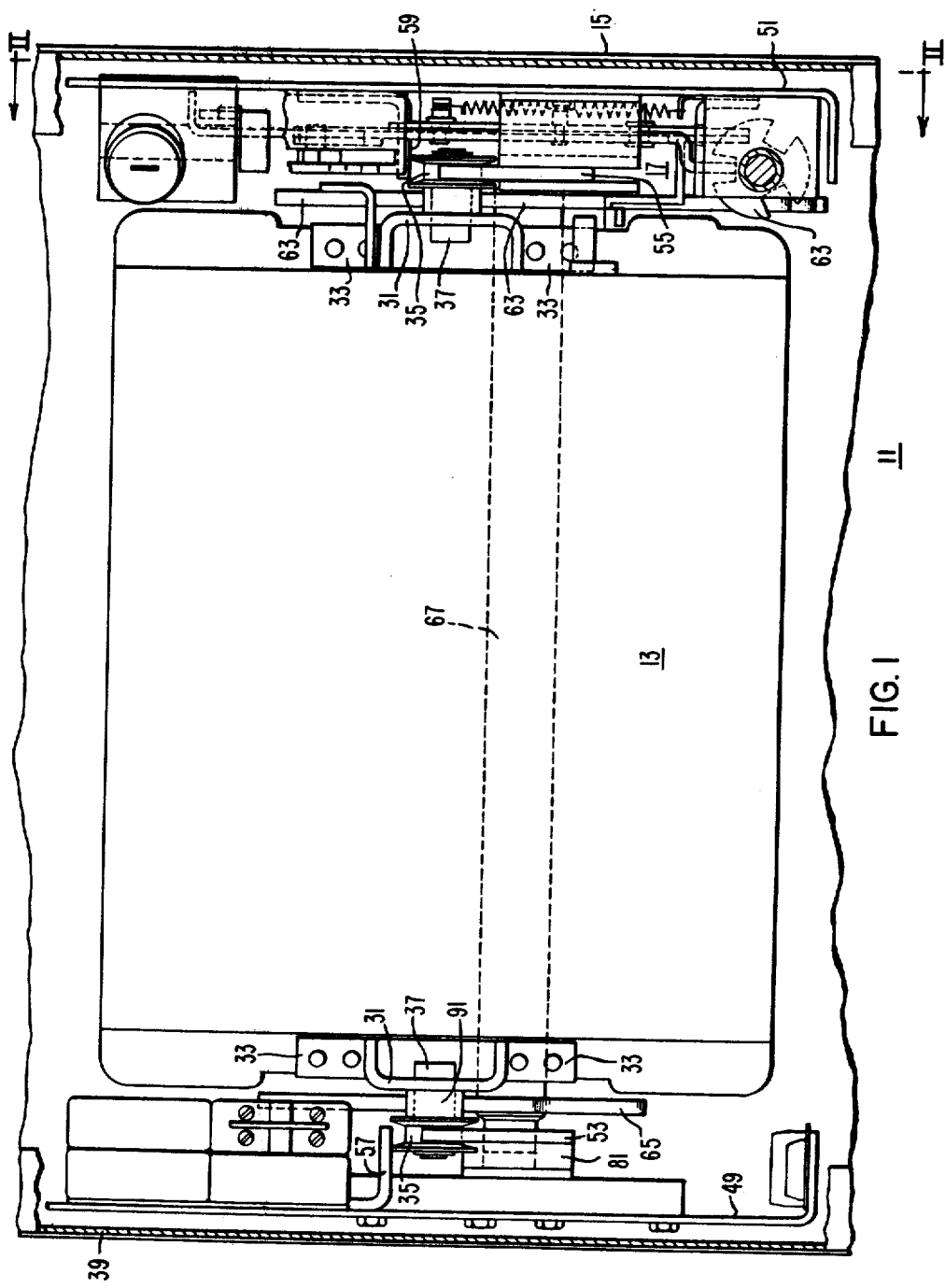
FIG. 1 is a front elevational view partly in section showing a circuit breaker within a cell.
Figure 2:
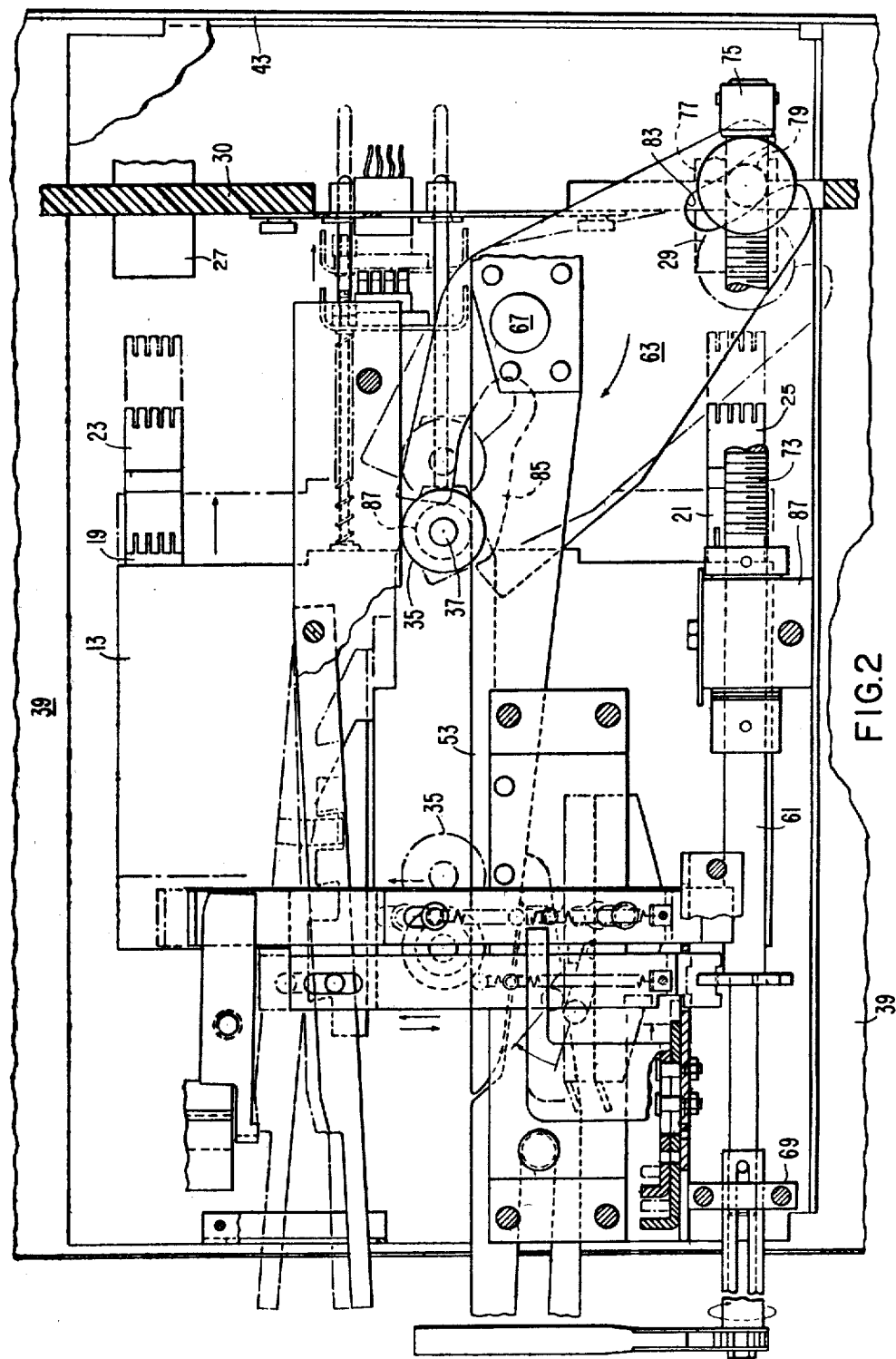
FIG. 2 is a vertical sectional view showing the circuit breaker in the open or disconnected position, taken on the line II—II of FIG. 1.

In FIGS. 1 and 2 a drawout switchgear is generally at 11 and it comprises a circuit interrupter or circuit breaker 13, a cell 15, and a levering-in mechanism generally indicated at 17. The circuit breaker 13 is similar in construction and operation to that disclosed in U.S. Pat. No. 4,139,748. The circuit breaker 13 is contained in a molded housing compound of high-strength phenolic resin reinforced with glass fiber. As shown in FIG. 2 terminals 19, 21 extend from the rear wall of the housing. Similar terminal connectors 23, 25 are mounted on the terminals 19, 21, respectively.

Figure 3:
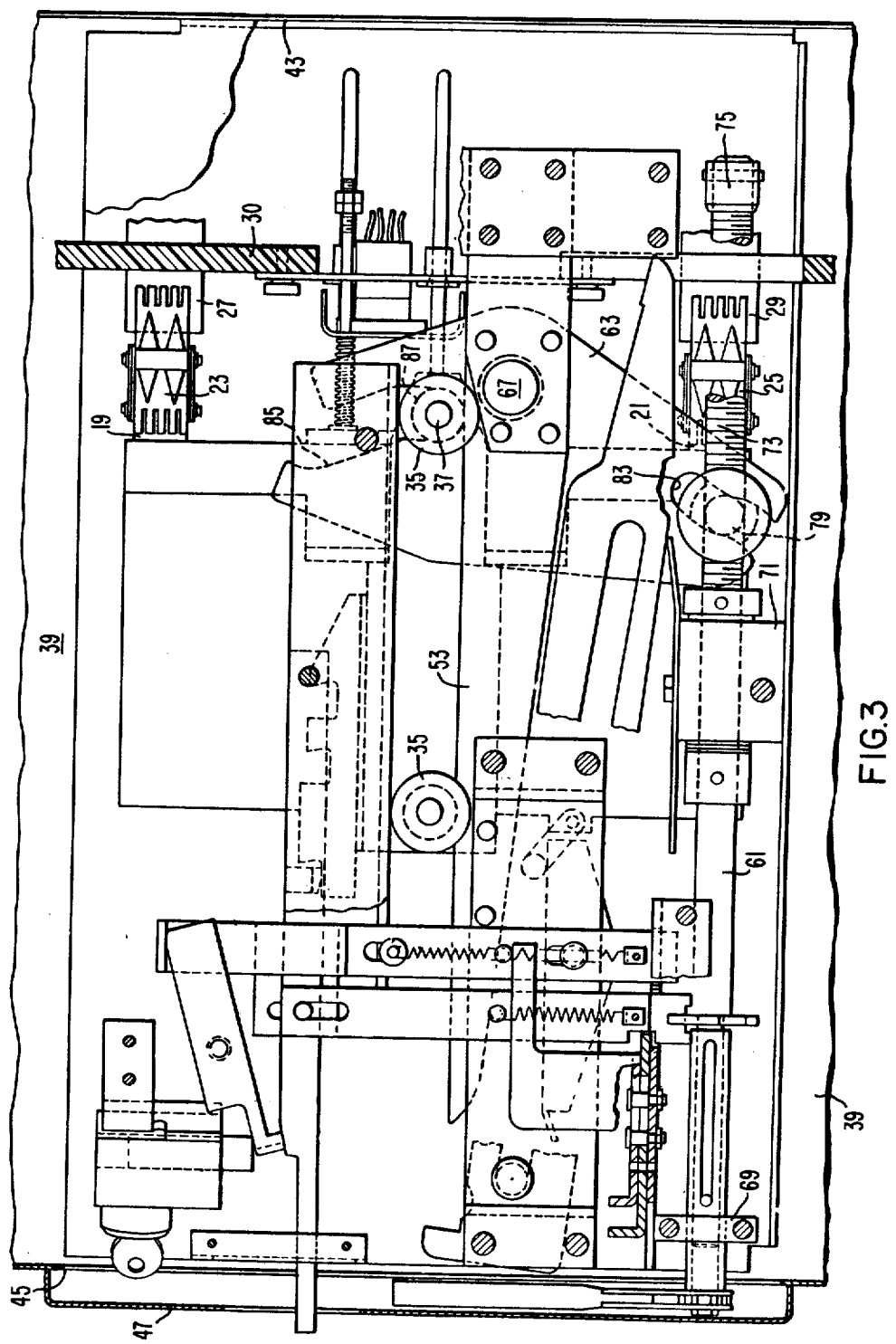
FIG. 3 is a vertical sectional view similar to FIG. 2 showing the operating parts in closed or connected positions.

In the disconnected position (FIG. 2) of the circuit breaker the terminal connectors 23, 25 are shown in alignment with stationary terminals 27, 29 which extend through a rear wall 30. When the circuit breaker 13 is in the connected or closed condition (FIG. 3), the terminal connectors 23, 25 are in electrical engagement with the stationary line and load terminals 27, 29.

As shown in FIG. 1 a pair of similar brackets is mounted on the circuit breaker 13, one on each side, by similar flanges 33. Similar wheels or rollers 35 (FIGS. 1 and 2) are mounted on similar axles or pins 37 extending from the brackets 31.

The cell 15 comprises opposite side walls 39 (FIG. 1), a back wall 43, and a front opening 45 (FIG. 2). A door or cover 47 (FIG. 3) closes the front opening 45 when the switchgear is in operation. Frame members 49, 51 are mounted on opposite sides of the cell 15 for supporting the circuit breaker 13. A pair of tracks 53, 55 are provided, one on each side of the circuit breaker 13, for supporting the wheels 35. A hold-down flange 57, 59 is provided above each track 53, 55 for holding the wheels 35 in place on the tracks.

The levering-in mechanism 17 comprises an operating shaft 61 and camming means including a pair of cams 63, 65 mounted on opposite ends of a cam shaft 67. The operating shaft 61 is journally-mounted in spaced bearings 69, 71. The right end of the shaft 61 includes a threaded portion 73 with a stop block 75 on the end thereof. A nut 77 (FIG. 2) has a guide pin 79 and is mounted on the threaded portion 73.

The cam 63 is mounted on the shaft 67 in bearing blocks 81 (one of which is shown in FIG. 1) at opposite ends thereof which blocks extend from the frames 49, 51. The second cam 65 (FIG. 1) is mounted on the end of the cam shaft 67 opposite the cam 63. The cams 63, 65 are registered to function simultaneously for moving the circuit breaker 13 between disconnected and connected positions of the terminal connectors 23, 25 and the stationary terminals 27, 29.

For that purpose the lower end of the cam 63 has a slot 83 in which the pin 79 is disposed. As the nut 77 moves along the threaded portion 73 of the operating shaft 61, the pin moves between the positions shown in FIGS. 2 and 3 corresponding to the disconnected and connected (or closed) positions of the terminals.

The upper end of the cam 63 also comprises a slot 85 which engages a bushing 87 on the pin 37 for moving the circuit breaker 13 between the connected and disconnected positions. The cam 65 on the opposite end of the cam shaft 67 has a slot similar to slot 85 on the cam 63 for engaging a bearing 91.

It has been found in accordance with this invention that drawout switchgear structures of prior constructions, such as shown in U.S. Pat. No. 4,139,748, involve a time-consuming problem of inserting cam shafts in place and that a solution was required. For that reason the cam shaft 67 (FIGS. 4 and 5) include at least one and preferably two telescopic portions by which the length of the shaft is shortened for preliminary insertion into position during assembly. Thereafter, the telescopic portions are extended and secured in place in a final assembly. Axles 93, 95 are telescopically seated in similar bores 97 at opposite ends of the cam shaft 67.

As shown more particularly for the axle 93 (FIG. 5), each axle includes a flange 99 and in the retracted position is completely seated up to the flange within the bore 97 with the end wall aligned with an access hole 101. When the outer end of the axle 93 is aligned with a hole 103 in the bearing block 81, an instrument, such as a screwdriver 105, is inserted into the hole 101 to move the axle 93 to the left (FIG. 5), as indicated by the broken line 93a, thereby moving the left end of the axle into the hole 103, until the flange 99 engages the wall of the bearing block 81. In a similar manner the axle 95 (FIG. 4) is moved into the bearing block corresponding to the block 81 on the right side of the cell. The axles are secured in place by tightening set screws 107, 109. The movement of the axles in the ends does not have any influence on the cams being registered since they are both welded to the shaft.

In another embodiment of the invention a single telescopic structure may be used whereby, for example, only one end position or a central segment of the cam shaft 67 may be telescopically seated within central bore to enable relative movement of separate portions of the cam shaft. Such an embodiment is indicated at 111 in FIG. 4. Subsequently, the cams 63, 65 are indexed.

In conclusion, the device of this invention provides for a simplified means for installing the assembly of the cams and cam shaft in place in a minimum of time during assembly of drawout switchgear.

What is claimed is:

1. Drawout switchgear comprising a cell having a front opening and a rear wall, stationary terminal means extending from the rear wall into the cell, a circuit interrupting unit movable into and out of the cell, movable terminal means on said unit and movable with the unit into and out of contact with the stationary terminal means, a levering-in mechanism for moving the unit between connected and disconnected positions of the terminal means, the levering-in mechanism comprising an operating shaft supported for rotation about an axis that extends generally in the direction of movement of said unit, a cam pivotally mounted on the cell and operatively connected to the operating shaft and being reversely movable between two positions corresponding to the disconnected and connected positions, the cam having a slot extending from the cam periphery, a cam pin on the unit and movable into and out of operation with the cam slot for movement of said unit between the disconnected and connected positions, pivotal mounting means for the cam and comprising a cam shaft for the cam, the shaft having opposite end portions journally-mounted in spaced frame members of the cell, the cam shaft having telescoping shaft segments that are contractible for preliminary insertion into location during assembly and that are then extendable for insertion of end portions into journal mounts in the frame members, and means on the shaft segments for securing them in the extended position.

2. The drawout switchgear of claim 1 in which the telescoping shaft portions include the opposite end portions slidably disposed on the ends of the shaft.

3. The drawout switchgear of claim 1 in which the cam shaft is shorter than the space between the frame members, each end of the cam shaft having an extension member slidably mounted thereon for connection with the journal mounts.

4. The drawout switchgear of claim 3 in which each end of the cam shaft comprises an axial bore, a shaft segment is slidably mounted in each bore, and set screw means in the shaft for securing the segments in preset positions.

5. The drawout switchgear of claim 4 in which one cam is mounted on each end of the cam shaft.

* * * * *